(12) United States Patent
Freund et al.

(10) Patent No.: US 8,944,035 B2
(45) Date of Patent: Feb. 3, 2015

(54) SYSTEMS AND METHODS FOR CONTROLLING EXHAUST GAS RECIRCULATION

(75) Inventors: Sebastian Walter Freund, Garching (DE); Jassin Fritz, Munich (DE); Georgios Bikas, Garching (DE); Sean Jenkins, Garching (DE)

(73) Assignee: General Electric Company, Schenectady, NY (US)

(*) Notice: Subject to any disclaimer, the term of this patent is extended or adjusted under 35 U.S.C. 154(b) by 758 days.

(21) Appl. No.: 13/172,297

(22) Filed: Jun. 29, 2011

(65) Prior Publication Data

US 2013/0000614 A1 Jan. 3, 2013

(51) Int. Cl.
*F02M 25/07* (2006.01)
*F02D 21/08* (2006.01)
*F02D 41/00* (2006.01)
*F02B 29/04* (2006.01)

(52) U.S. Cl.
CPC ............. *F02D 21/08* (2013.01); *F02D 41/005* (2013.01); *F02M 25/0744* (2013.01); *F02M 25/0749* (2013.01); *F02D 41/0077* (2013.01); *F02D 41/0082* (2013.01); *F02D 2021/083* (2013.01); *F02B 29/0406* (2013.01); *F02M 25/0727* (2013.01); *Y02T 10/47* (2013.01)
USPC ............. 123/568.11; 123/568.21; 123/568.23

(58) Field of Classification Search
CPC .......... F02M 25/0707; F02M 25/0709; F02M 25/071–25/0713; F02M 25/0717
USPC ............. 123/568.11, 568.17–568.21, 568.23; 60/605.2
See application file for complete search history.

(56) References Cited

U.S. PATENT DOCUMENTS

| 4,969,445 A | 11/1990 | Hertweck et al. |
| 5,121,734 A | 6/1992 | Grieshaber et al. |
| 2004/0194463 A1 | 10/2004 | Yanagisawa et al. |
| 2005/0028515 A1* | 2/2005 | Fukuma et al. ................. 60/276 |
| 2005/0274366 A1* | 12/2005 | Sato ........................... 123/568.2 |

(Continued)

FOREIGN PATENT DOCUMENTS

| DE | 102009037285 A1 | 2/2011 |
| EP | 1217199 A1 | 6/2002 |

(Continued)

OTHER PUBLICATIONS

Search Report and Written Opinion from corresponding PCT Application No. PCT/US2012/043691 dated Nov. 27, 2012.

*Primary Examiner* — John Kwon
(74) *Attorney, Agent, or Firm* — GE Global Patent Operation; John A. Kramer

(57) ABSTRACT

Exhaust gas recirculation (EGR) systems and methods are provided. In one embodiment, a method for controlling an engine includes providing a first EGR gas flow to an intake manifold of the engine by closing a first EGR valve or a second EGR valve and at least partially opening the other of the first EGR valve and the second EGR valve, wherein the first and second EGR valves are respectively positioned in first and second EGR passages respectively coupled between first and second donor cylinder groups and an intake manifold, and providing a second EGR gas flow that is higher than the first EGR gas flow to the intake manifold by fully opening the first EGR valve or the second EGR valve and at least partially opening the other of the first EGR valve and the second EGR valve.

17 Claims, 3 Drawing Sheets

(56) References Cited

U.S. PATENT DOCUMENTS

| | | | |
|---|---|---|---|
| 2008/0060624 A1* | 3/2008 | Grandas | 123/568.12 |
| 2008/0216475 A1 | 9/2008 | Kasper et al. | |
| 2009/0145116 A1* | 6/2009 | Miyashita et al. | 60/286 |
| 2010/0115922 A1* | 5/2010 | Inoue et al. | 60/285 |
| 2011/0000448 A1 | 1/2011 | Buckland et al. | |
| 2012/0285161 A1* | 11/2012 | Kerns et al. | 60/598 |
| 2013/0199176 A1* | 8/2013 | Cattani et al. | 60/602 |

FOREIGN PATENT DOCUMENTS

| | | |
|---|---|---|
| EP | 1744035 A1 | 1/2007 |
| EP | 2206899 A1 | 7/2010 |
| JP | 58096159 A | 6/1983 |
| JP | 2008069722 A | 3/2008 |

* cited by examiner

SYSTEMS AND METHODS FOR CONTROLLING EXHAUST GAS RECIRCULATION

FIELD

The subject matter disclosed herein relates to exhaust gas recirculation (EGR) systems and methods, and more particularly to controlling the introduction of EGR gas into an engine intake.

BACKGROUND

Engines may utilize recirculation of exhaust gas from an exhaust passage to an intake manifold, a process referred to as Exhaust Gas Recirculation (EGR), to reduce regulated emissions. In one approach, one or more cylinders are dedicated to generating EGR gas that is delivered to the intake manifold for combustion. These cylinders may be referred to as donor cylinders. Correspondingly, one or more other cylinders are dedicated to generating exhaust gas that is delivered to an exhaust pipe for a turbocharger and after-treatment. These cylinders may be referred to as non-donor cylinders. One benefit of utilizing a donor cylinder EGR system is exhaust backpressure that is created from routing EGR gas to the intake manifold may be limited to only the donor cylinders, while the remaining non-donor cylinders operate with a relatively lower exhaust backpressure. Accordingly, the non-donor cylinders can operate at more efficient exhaust pressure levels relative to an EGR system in which all cylinders contribute EGR gas.

BRIEF DESCRIPTION OF THE INVENTION

However, the inventors herein have identified issues with the above described approach. For example, an amount of EGR gas provided to the intake manifold may be limited due to the fixed number of donor cylinders from which exhaust gas is delivered back into the intake manifold. Depending on the operating conditions, this fixed amount of EGR may be inadequate to reach emission or efficiency targets over a wide engine operating range.

In one embodiment, a method for controlling an engine includes providing a first EGR gas flow to an intake manifold of the engine that is less than a maximum capable EGR gas flow that a first donor cylinder group or a second donor cylinder group of the engine can supply by adjusting a first EGR valve or a second EGR valve and closing the other of the first EGR valve and the second EGR valve, wherein the first and second EGR valves are respectively positioned in first and second EGR passages respectively coupled between the first and second donor cylinder groups and the intake manifold, and providing a second EGR gas flow to the intake manifold that is greater than the maximum capable EGR gas flow by adjusting the first EGR valve or the second EGR valve and fully opening the other of the first EGR valve and the second EGR valve.

By selectively backpressuring either of the first donor cylinder group or the second donor cylinder group at one time to provide a commanded EGR gas flow when the commanded EGR flow is within the capability of one donor cylinder group, the donor cylinder group that is less backpressured operates at a higher efficiency. Accordingly, a commanded EGR gas flow is provided across an entire engine operating range of the engine while reducing efficiency penalties due to backpressuring all donor cylinders.

This brief description is provided to introduce a selection of concepts in a simplified form that are further described herein. This brief description is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure. Also, the inventors herein have recognized any identified issues and corresponding solutions.

BRIEF DESCRIPTION OF THE DRAWINGS

The present invention will be better understood from reading the following description of non-limiting embodiments, with reference to the attached drawings, wherein less than.

DETAILED DESCRIPTION

The present description relates to systems and methods for controlling EGR gas flow generated from different groups of donor cylinders of an engine. More particularly, the present description relates to selectively backpressuring only as many cylinder groups as needed to provide to a commanded EGR gas flow. In one example, an engine includes two different groups of donor cylinders. Each group of donor cylinders is equipped with EGR valves and exhaust valves that are adjustable to direct exhaust gas between an exhaust pipe and an EGR passage. The valves are controlled such that a minimum number of donor cylinder groups to provide a commanded amount of EGR are backpressured at any time.

For example, when a lower EGR gas flow is commanded, the valves of one donor cylinder group are adjusted to direct exhaust gas to the exhaust pipe so as not to create excess backpressure in that donor cylinder group, and the valves of the other donor cylinder group are adjusted or throttled to provide the commanded EGR gas flow. As another example, when higher EGR gas flow is commanded, EGR valves of one donor cylinder group are adjusted to direct all exhaust gas to the EGR passage and the valves of the other donor cylinder group are adjusted or throttled to provide the commanded EGR gas flow. By using multiple donor cylinder groups that can be independently backpressured and by backpressuring only as many donor cylinder groups as needed (e.g., one cylinder group at a time) to provide a commanded EGR gas flow, variable EGR gas flow can be provided across an entire engine operating range without having to backpressure all of the donor cylinders. Accordingly, the operating performance of the engine is increased since the number of cylinders that are backpressured to provide EGR gas flow is reduced.

Figure 1:
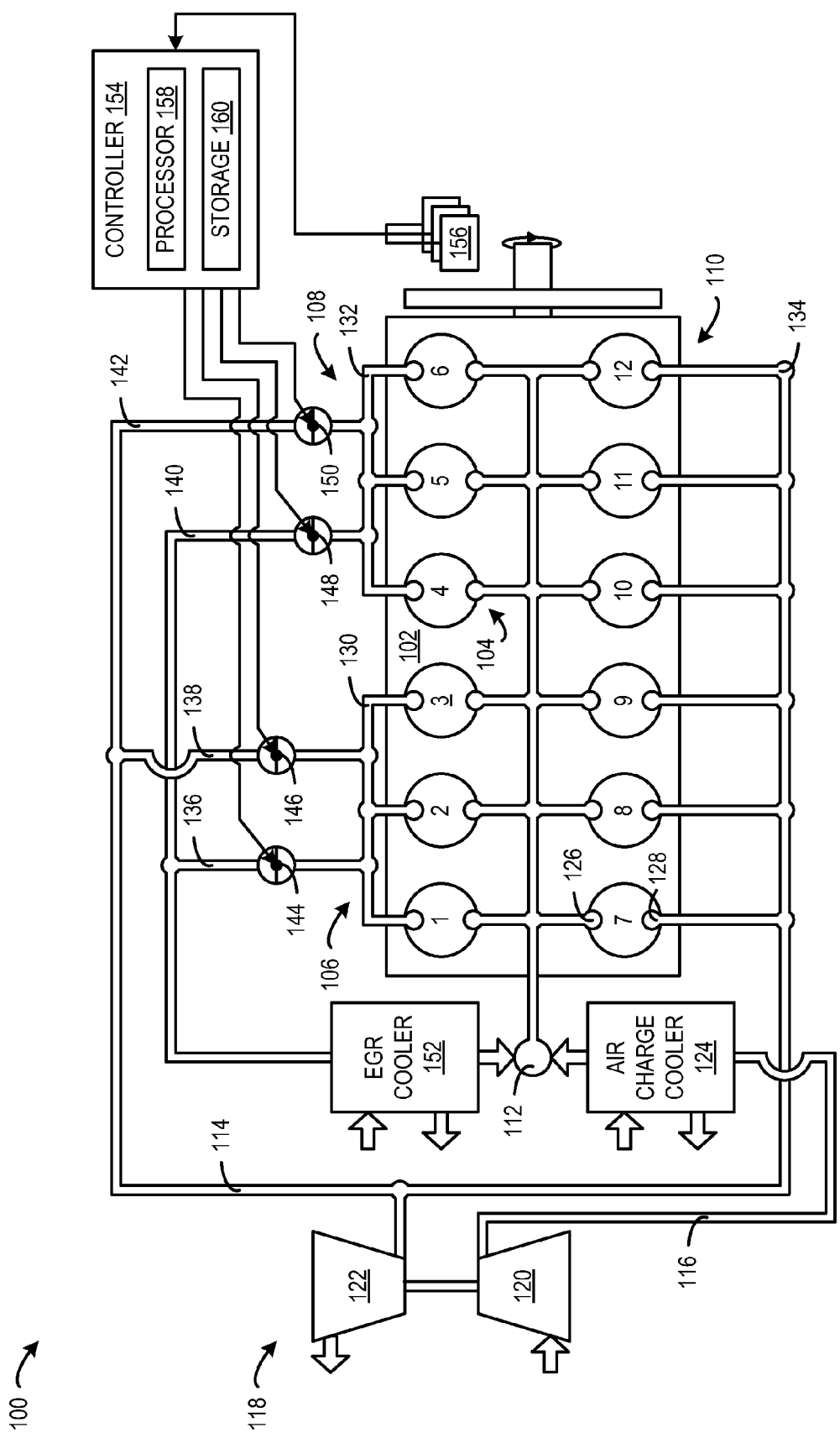
FIG. 1 schematically shows an embodiment of an engine system of the present disclosure.

FIG. 1 shows an embodiment of an engine system 102 coupled to a vehicle 100. For example, the vehicle 100 may include a locomotive, marine vessel, Off-Highway Vehicle (OHV), etc. The engine system 102 includes a plurality of cylinders 104. The plurality of cylinders 104 are organized into donor cylinder groups and non-donor cylinder groups. In particular, the engine system 102 includes a first cylinder group 106 that includes at least one a first cylinder, a second cylinder group 108 that includes at least one a second cylinder, and a third cylinder group 110 that includes at least one a third cylinder. Note, that "first," "second," and "third" are labels to denote the cylinders of the first, second, and cylinder groups, respectively.

The first cylinder group 106 and the second cylinder group 108 are donor cylinders that provide exhaust gas that is selectively directed to an intake manifold 112 of the engine system 102. The third cylinder group 110 is a non-donor cylinder group that provides exhaust gas to an exhaust pipe 114. In the illustrated implementation, the first cylinder group 106 includes three cylinders (e.g., cylinder 1-3), the second cylinder group 108 includes three cylinders (e.g., cylinders 4-6), and the third cylinder group 110 includes six cylinders (e.g., cylinders 7-12. It will be appreciated that each of the cylinder groups may include any suitable number of cylinders. Furthermore, the engine system may include any suitable number of donor cylinder groups and non-donor cylinder groups.

The intake manifold 112 couples to the first cylinder group 106, the second cylinder group 108, and the third cylinder group 110. An intake passage 116 supplies fresh air to the intake manifold 112 for combustion. In particular, air enters the intake passage 116 from the environment and passes through a compressor 120 of a turbocharger 118. In the illustrated implementation, the engine system 102 does not include a throttle valve positioned in the intake passage 116. However, in some implementations, the intake passage 116 may include a throttle valve positioned downstream of the compressor 120.

The turbocharger 118 includes the compressor 120, which is coupled to a turbine 122. Rotation of the turbine 122 drives the compressor 120 compressing air passing through the intake passage 116 to increase the mass of air flowing to the intake manifold 112. Further, a charge air cooler 124 is disposed in the intake passage 116 downstream of the compressor 120 and upstream of the intake manifold 112. In some implementations, the charge air cooler 124 is in fluid communication with a liquid coolant and cools compressed air before the air is directed to the engine via the intake manifold 112. In some implementations of engine system 102, the turbocharger 118 is not included. In some implementations of engine system 102, the charge air cooler 124 is not included.

Each of the plurality of cylinders 104 includes at least one intake port 126 that is operable to receive combustion air from the intake manifold 112 and at least one exhaust port 128 that is operable to exhaust gas to an exhaust manifold. A first exhaust manifold 130 is coupled to the first cylinder group 106 to receive exhaust gas from the first cylinder group 106. The first exhaust manifold 130 is not coupled to the second cylinder group 108 or the third cylinder group 110. A first exhaust passage 138 is coupled between the first exhaust manifold 130 and the exhaust pipe 114. The first exhaust passage 138 is not coupled to a second exhaust manifold 132 or a third exhaust manifold 134. A first exhaust valve 146 is positioned in the first exhaust passage 138. The first exhaust valve 146 is operable to control exhaust gas flow from the first exhaust manifold 130 to the exhaust pipe 114. For example, opening the first exhaust valve 146 causes exhaust gas to flow from the first exhaust manifold 130, through the first exhaust passage 138, to the exhaust pipe 114. Note in some cases when a valve is referred to as being open it may be assumed that the valve is completely open as opposed to being throttled. Correspondingly, closing the first exhaust valve 146 increases backpressure of the cylinder group and when fully closed prevents exhaust gas from flowing from the first exhaust manifold 130 to the exhaust pipe 114.

A first EGR passage 136 is coupled between the first exhaust manifold 130 and the intake manifold 112. The first EGR passage 136 is not coupled to the second exhaust manifold 132 or the third exhaust manifold 134. A first EGR valve 144 is positioned in the first EGR passage 136. The first EGR valve 144 is operable to control EGR gas flow from the first exhaust manifold 130 to the intake manifold 112. For example, opening the first EGR valve 144 while closing exhaust valve 146 causes exhaust gas to flow from the first exhaust manifold 130, through the first EGR passage 136, to the intake manifold 112. Correspondingly, closing the first EGR valve 144 prevents exhaust gas from flowing from the first exhaust manifold 130 to the intake manifold 112. As another example, throttling or adjusting the first EGR valve 144 to a position between open and closed causes partial EGR gas flow to the intake manifold 112. By throttling or adjusting the first EGR valve 144 to a particular position, EGR gas flow from the first exhaust manifold 130 to the intake manifold 112 can be controlled to a commanded EGR gas flow.

In some implementations, the first exhaust valve 146 and the first EGR valve 144 are adjusted in concert to vary EGR gas flow from the first cylinder group 106 to the intake manifold 112 and/or the exhaust pipe 114. In some implementations, adjustment of the first EGR valve 144 and the first exhaust valve 146 correspond inversely. In other words, the first EGR valve 144 and the first exhaust valve 146 move in opposite directions. For example, the first exhaust valve 146 closes while the first EGR valve 144 opens and vice versa.

The second exhaust manifold 132 is coupled to the second cylinder group 108 to receive exhaust gas from the second cylinder group 108. The second exhaust manifold 132 is not coupled to the first cylinder group 106 or the third cylinder group 110. A second exhaust passage 142 is coupled between the second exhaust manifold 132 and the exhaust pipe 114. The second exhaust passage 142 is not coupled to the first exhaust manifold 130 or the third exhaust manifold 134. A second exhaust valve 150 is positioned in the second exhaust passage 142. The second exhaust valve 150 is operable to control exhaust gas flow from the second exhaust manifold 132 to the exhaust pipe 114. For example, opening the second exhaust valve 150 causes exhaust gas to flow from the second exhaust manifold 132, through the second exhaust passage 142, to the exhaust pipe 114. Correspondingly, closing the second exhaust valve 150 prevents exhaust gas from flowing from the second exhaust manifold 132 to the exhaust pipe 114.

A second EGR passage 140 is coupled between the second exhaust manifold 132 and the intake manifold 112. The second EGR passage 140 is not coupled to the first exhaust manifold 130 or the third exhaust manifold 134. A second EGR valve 148 is positioned in the second EGR passage 140. The second EGR valve 148 is operable to control EGR gas flow from the second exhaust manifold 132 to the intake manifold 112. For example, opening the second EGR valve 148 causes exhaust gas to flow from the second exhaust manifold 132, through the second EGR passage 140, to the intake manifold 112. Correspondingly, closing the second EGR valve 148 prevents exhaust gas from flowing from the second exhaust manifold 132 to the intake manifold 112. As another example, throttling or adjusting the second EGR valve 148 to a position between open and closed causes partial EGR gas flow to the intake manifold 112. By throttling or adjusting the second EGR valve 148 to a particular position, EGR gas flow from the second exhaust manifold 132 to the intake manifold 112 can be controlled to a commanded EGR gas flow.

In some implementations, the second exhaust valve 150 and the second EGR valve 148 are adjusted in concert to vary EGR gas flow from the second cylinder group 108 to the intake manifold 112 and/or the exhaust pipe 114. In some implementations, adjustment of the second EGR valve 148 and the second exhaust valve 150 correspond inversely. In other words, the second EGR valve 148 and the second exhaust valve 150 move in opposite directions. For example, the second exhaust valve 150 closes while the second EGR valve 148 opens and vice versa. The first cylinder group 106 and the second cylinder group 108 selectively contribute exhaust gas for EGR flow through the first EGR passage 136 and the second EGR passage 140, and thus are considered donor cylinder groups.

Since each of the first exhaust manifold 130 and the second exhaust manifold 132 are not coupled to each other and each connect with the intake manifold 112 and the exhaust pipe 114 through separate EGR and exhaust passages, under certain operating conditions, the donor cylinder groups can be fluidly disconnected by adjusting the EGR and exhaust valves corresponding so that exhaust backpressure created to produce EGR gas flow for one cylinder group does not increase backpressure of the other donor cylinder group. Accordingly, a greater number of cylinders operate with less backpressure and greater efficiency. In other words, the first exhaust manifold 130 and the second exhaust manifold 132 are mutually exclusive, in that exhaust gas from the first exhaust manifold does not flow into the second exhaust manifold and vice versa. Under some conditions, exhaust gas flow from one donor cylinder group flows to the intake manifold 112 or the exhaust pipe 114 without mixing with exhaust gas flow from the other donor cylinder group.

Note the term "valve" refers to a device that is controllable to selectively fully open, fully close, or partially open a passage to control gas flow through the passage. Moreover, the valve is controllable to any position between open and closed to vary gas flow to a commanded gas flow. It is to be understood that valve is merely one example of a control device and any suitable control element may be employed to control gas flow without departing from the scope of this disclosure.

An EGR cooler 152 is positioned in between the first EGR passage 136, the second EGR passage 140, and the intake manifold 112. The EGR cooler 152 is in fluid communication with a liquid coolant or other coolant to cool the exhaust gases from the first cylinder group 106 and the second cylinder group 108 as the gas passes through to the intake manifold 112. Additionally, the liquid coolant may be the same coolant as supplied to the charge air cooler 124, or a different coolant.

A third exhaust manifold 134 is coupled to the third cylinder group 110. The third exhaust manifold 134 is not coupled to the first cylinder group 106 or the second cylinder group 108. The third exhaust manifold 134 directs exhaust gas from the third cylinder group 110 to the exhaust pipe 114. The third exhaust manifold 134 is not coupled to the intake manifold 112, and the third cylinder group 110 does not contribute exhaust gas to EGR flow. Thus, the third cylinder group 110 is considered a non-donor cylinder group Exhaust gas received from each of the cylinder groups flow through the exhaust pipe 114, where it is emitted to the environment. The exhaust pipe 114 may include exhaust gas after-treatment devices, elements and components to treat exhaust gas (not shown), for example, a diesel oxidation catalyst, particulate matter trap, hydrocarbon traps, SCR catalyst system, lean NOx trap, etc. Further in the illustrated implementation, exhaust gas flowing through the exhaust pipe 114 drives the turbine 122 of the turbocharger 118.

In the illustrated implementation, the engine system 102 is a V-type engine including a first bank and a second bank. (According to one aspect, the first bank is on one side or branch of the "V", and the second bank is on the other side or branch of the "V.") The cylinders in the first cylinder group 106 are in the first bank and the cylinders in the second cylinder group 108 are in the first bank. The cylinders in the third cylinder group 110 are in the second bank. Such a configuration reduces complexity of exhaust manifold construction, for example by having no cross-bank manifold connections. Such exhaust manifold configuration simplicity reduces exhaust manifold construction costs. The plurality of cylinders 104 are grouped not only to simplify exhaust manifold construction, but are selected according to a cylinder firing order of the engine system 102. In particular, the cylinders may be grouped so that the first cylinder group 106 and the second cylinder group 108 generate the same amount of exhaust gas for EGR over an interval. An example firing order that provides balanced EGR production between the first cylinder group 106 and the second cylinder group 108 is 1, 7, 5, 11, 3, 9, 6, 12, 2, 8, 4, and 10.

A controller 154 receives various signals from sensors 156 coupled to the engine system 102 that influence EGR flow control. For example, the controller 154 receives sensor signals indicative of air-fuel ratio, engine speed, engine load, engine temperature, ambient temperature, intake manifold temperature, exhaust temperature, intake manifold pressure, exhaust pressure, boost pressure etc. In the illustrated implementation, the controller 154 is a computing device, such as microcomputer that includes a processor unit 158, non-transitory computer-readable storage medium device 160, input/output ports, memory, a data bus, etc. Computer-readable storage medium device 160 is programmable with computer readable data representing instructions executable by the processor for performing the methods described below as well as other variants that are anticipated but not specifically listed.

The controller 154 is operable to adjust various actuators in the engine system 102 based on different operating parameters received or derived from different signals received from the sensors 156 to EGR gas flow in the engine system 102. For example, the controller 154 determines a commanded EGR gas flow (e.g., rate, amount, etc.) and adjusts the first EGR valve 144, the first exhaust valve 146, the second EGR valve 148, and/or the second exhaust valve 150 to provide the commanded EGR gas flow to the intake manifold 112. In particular, as the commanded EGR gas flow increases, the controller 154 is operable to throttle or adjust the EGR valve of one of the donor cylinder groups to backpressure that exhaust manifold and vary the EGR flow from that exhaust manifold to the intake manifold to meet the commanded EGR gas flow. The EGR valve of one donor cylinder group may be adjusted till it is fully opened, before the EGR valve of the other donor cylinder group is opened. In this way, the other donor cylinder group is not backpressured and operates at a higher efficiency level until exhaust gas generated by the cylinder group is needed to meet the commanded EGR gas flow.

For example, when the commanded EGR gas flow is less than an EGR threshold, that is set to the maximum capable EGR flow of one of the donor cylinder groups, for example, the controller 154 is operable to backpressure one of the first cylinder group 106 or the second cylinder group 108. The controller 154 is operable to provide a commanded EGR gas flow to the intake manifold that is less than a maximum capable EGR gas flow that one cylinder group can supply by adjusting the first EGR valve 144 or the second EGR valve 148 and closing the other of the first EGR valve 144 and the second EGR valve 148. Correspondingly, the controller 154 is operable to adjust the first exhaust valve 146 or the second exhaust valve 150 and fully open the other of the first exhaust valve 146 and the second exhaust valve 150. The cooperatively adjusted EGR valve and exhaust valve creates backpressure in the associated exhaust manifold to cause EGR gas to flow to the intake manifold 112. Furthermore, the cooperatively closed EGR valve and opened exhaust valve reduces backpressure in the cylinder of the other donor cylinder group.

When the commanded EGR gas flow is greater than the EGR amount that one donor cylinder group alone can provide, the controller 154 is operable to direct exhaust gas from one of the first cylinder group 106 or the second cylinder group 108 to the EGR passage by adjusting the valves and increasing the backpressure. For example, the controller 154 directs exhaust gas from the first cylinder group 106 to the intake manifold 112 by fully opening the first EGR valve 144 and fully closing the first exhaust valve 146. The controller 154 directs exhaust gas from the second cylinder group 108 to the intake manifold 112 by fully opening the second EGR valve 148 and fully closing the second exhaust valve 150.

In some implementations, the controller 154 is operable to close the first EGR valve 144 and the second EGR valve 148 and open the first exhaust valve 146 and the second exhaust valve 150 to not subject the first cylinder group 106 and the second cylinder group 108 to extra backpressure when the commanded EGR gas flow is zero.

In some implementations, the controller 154 is operable to close the first exhaust valve 146 and the second exhaust valve 150 and open the first EGR valve 144 and the second EGR valve 148 when the commanded EGR gas flow is a maximum capable EGR gas flow. In the illustrated implementation, the maximum capable EGR gas flow is 50% since six of the twelve cylinders of the engine system 102 are donor cylinders.

In some implementations, the storage medium device 160 includes one or more sets of instructions stored thereon that when carried out by the processor unit 158 of the controller 154 cause the controller to: generate control signals for controlling the first EGR valve 144 and the second EGR valve 148. The control signals are generated based on operating parameters of the engine system 102 for controlling an amount of EGR gas flow provided to the intake manifold 112. The control signals comprise first control signals and second control signals. The first control signals command closing one of the first EGR valve 144 or the second EGR valve 148 and at least partially opening the other of the first EGR valve 144 and the second EGR valve 148. The second control signals command fully opening one of the first EGR valve 144 or the second EGR valve 148 and at least partially opening the other of the first EGR valve 144 and the second EGR valve 148. The controller 154 generates the first control signals responsive to a first operations signal for the amount of EGR gas flow to be lower, and to generate the second control signals responsive to a second operations signal for the amount of EGR gas flow to be higher.

Figure 2:
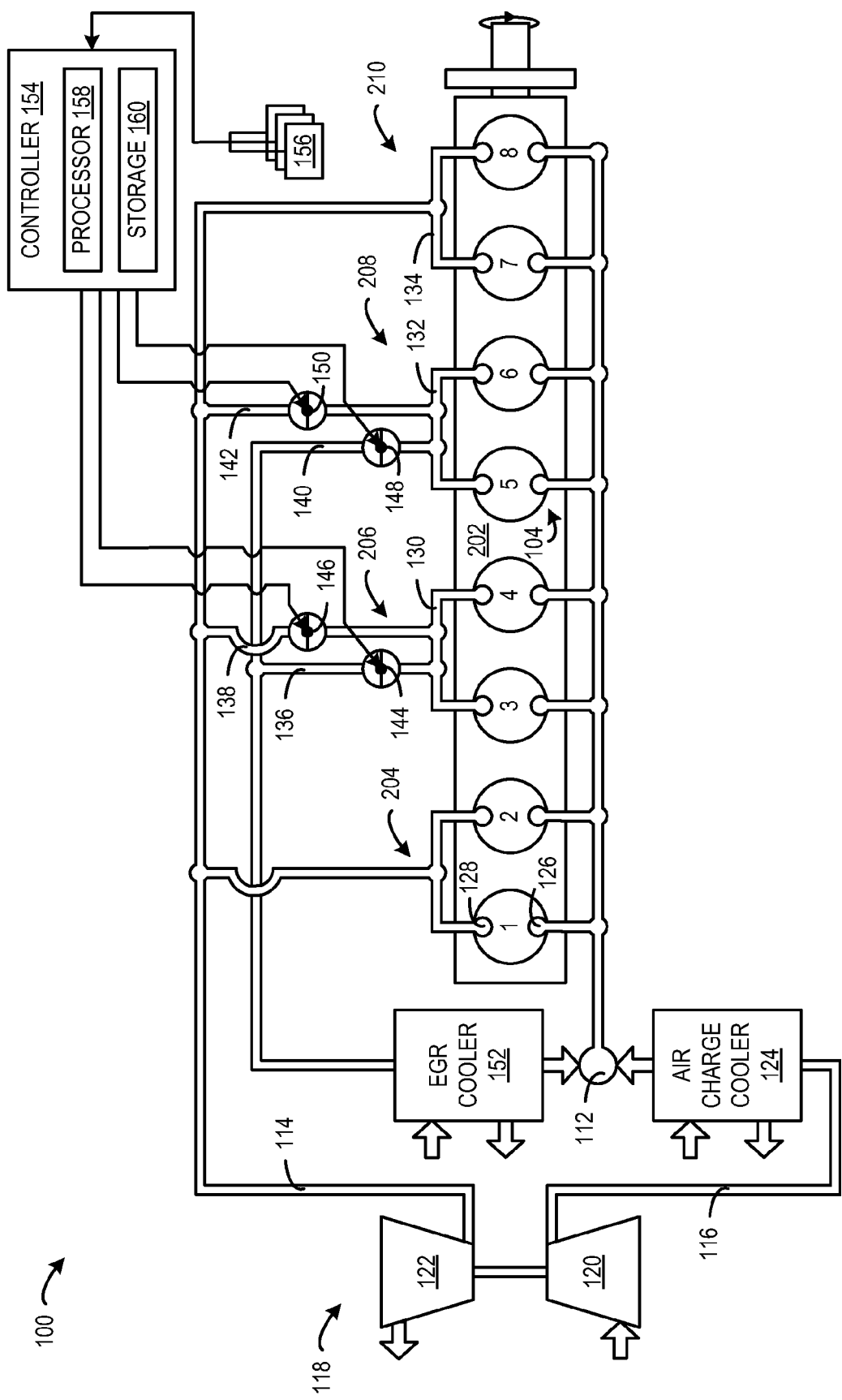
FIG. 2 schematically shows another embodiment of an engine system of the present disclosure.

FIG. 2 shows another embodiment of an engine system 202. The engine system 202 is an inline engine, as opposed to the V-type engine configuration of FIG. 1. The engine system 202 includes eight cylinders. The eight cylinders are organized into two donor cylinder groups and two non-donor cylinder groups. A first cylinder group 204 and a fourth cylinder group 210 are non-donor cylinders that provide exhaust gas only to the exhaust pipe 114 and not to the intake manifold 112. A second cylinder group 206 and a third cylinder group 208 are donor cylinders that selectively provide exhaust gas to the intake manifold 112 to meet commanded EGR gas flow. The second cylinder group 206 and the third cylinder group 208 are also coupled to the exhaust pipe 114 to selectively provide exhaust gas to the exhaust pipe. The cylinders of the engine system 202 are grouped according to cylinder firing order. An example cylinder firing order of the engine system 202 is 1, 6, 2, 5, 8, 3, 7, and 4. In order to have balanced EGR gas production between the two donor cylinder groups over an interval as well as to reduce exhaust manifold construction costs, the second cylinder group 206 and the third cylinder group 208 include interior cylinders (i.e., cylinders 3 and 4 in the second cylinder group and cylinders 5 and 6 in the third cylinder group) and the first cylinder group 204 and the fourth cylinder group 210 include at least one end cylinder, and more particularly two outermost cylinders on each end (i.e., cylinders 1 and 2 in the first cylinder group and cylinders 7 and 8 in the fourth cylinder group). The grouping of the cylinders in the inline engine provide balanced EGR gas production with reduced manifold construction cost while providing variable EGR gas flow over the operating of the engine and allows for backpressuring of individual donor cylinder groups to increase operating efficiency of the engine.

Components of the engine system 102 that may be substantially the same as those of the engine system 202 are identified in the same way and are described no further. However, it will be noted that components identified in the same way in different implementations of the present disclosure may be at least partly different.

Figure 3:
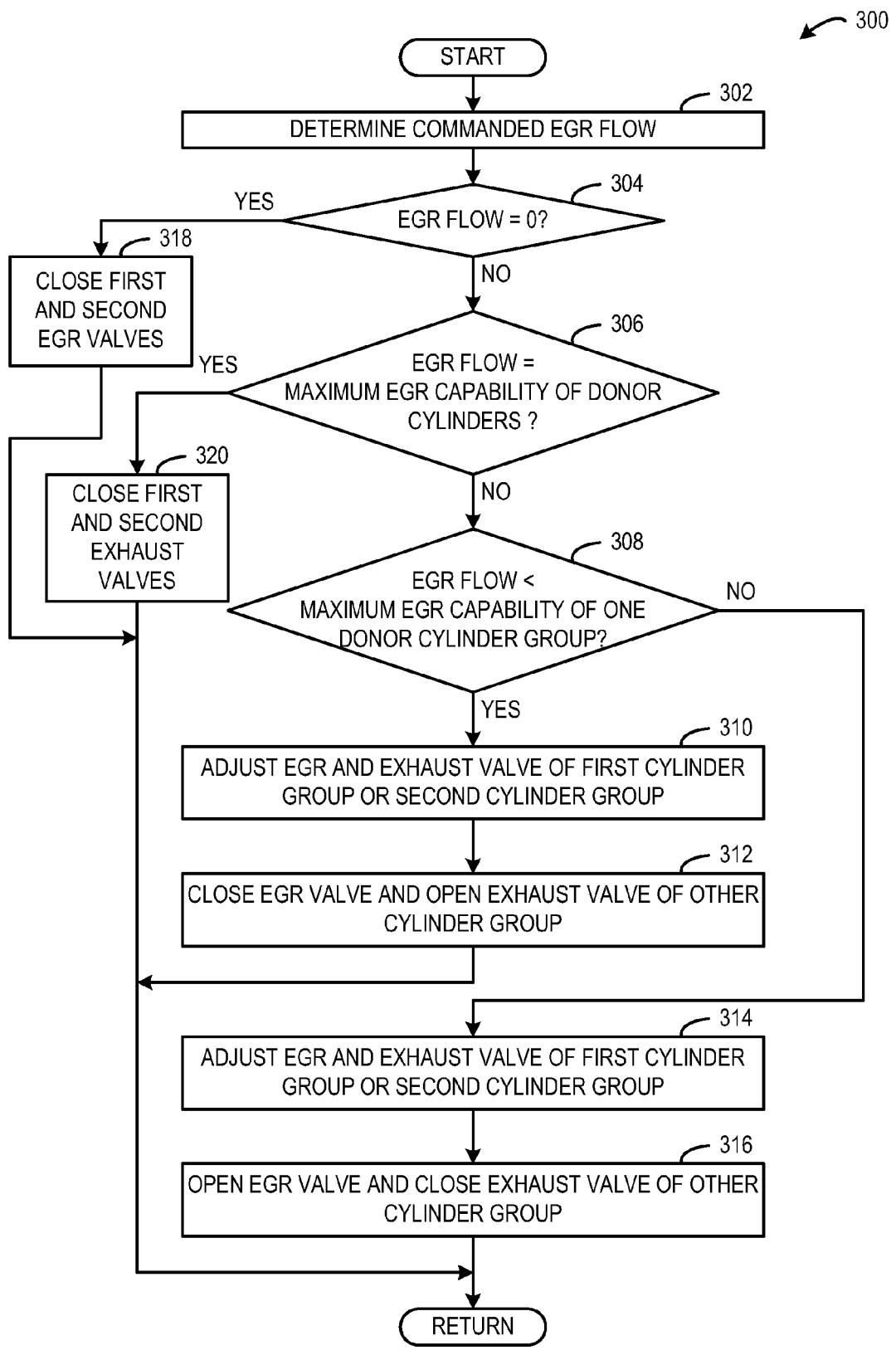
FIG. 3 shows a flow diagram of an embodiment of a method for controlling introduction of EGR gas into an intake manifold of an engine.

FIG. 3 shows a flow diagram of an embodiment of a method 300 for controlling EGR gas flow in an engine. In one example, the method 300 is executable by the controller 154 shown in FIGS. 1 and 2. At 302, the method 300 includes determining a commanded EGR gas flow. The commanded EGR gas flow is determined based on operating parameters indicative of sensor signals received from sensors coupled to the engine system. For example, signals provided from sensors 156 that are received by the controller 154 include air-fuel ratio, engine temperature, engine speed, engine load, intake manifold temperature, intake manifold pressure, exhaust temperature, exhaust pressure, ambient temperature, etc.

At 304, the method 300 includes determining if the commanded EGR gas flow is zero or no EGR gas flow is commanded. If the commanded EGR gas flow is zero, the method 300 moves to 318. Otherwise, the method 300 moves to 306.

At 306, the method 300 includes determining if the commanded EGR gas flow is a maximum EGR capability of both of the donor cylinders. For example, the maximum EGR capability of the engine systems 102 and 202 is 50% of the total exhaust produced. If it is determined that the commanded EGR gas flow is the maximum EGR capability, the method 300 moves to 320. Otherwise, the method 300 moves to 308.

At 308, the method 300 includes determining if the commanded EGR gas flow is less than a maximum EGR capability of one of the donor cylinder groups. If it is determined that the commanded EGR gas flow is less than the EGR threshold, the method 300 moves to 310. Otherwise, the method 300 moves to 314.

At 310, the method 300 includes adjusting the EGR valve and the exhaust valve of the first cylinder group or the second cylinder group to particular inversely corresponding positions to create backpressure in the selected donor cylinder group to provide the commanded EGR gas flow to the intake manifold.

At 312, the method 300 includes closing the EGR valve and fully opening the exhaust valve of the other donor cylinder group to direct exhaust gas from the other donor cylinder group to the exhaust pipe. By closing the EGR valve and fully opening the exhaust valve in the other donor cylinder group, exhaust backpressure may be reduced in the other cylinder group. Accordingly, the cylinders in that cylinder group operated with an increased efficiency relative to the other higher backpressured donor cylinder group.

At 314, the commanded EGR gas flow is greater than the maximum capable EGR gas flow that one of the donor cylinder groups can supply. Accordingly, both donor cylinder groups contribute exhaust gas for EGR. The method 300 includes adjusting the EGR valve and the exhaust valve of the first cylinder group or the second cylinder group to particular inversely corresponding positions to create backpressure in the selected donor cylinder group to provide the commanded EGR gas flow to the intake manifold. The selected cylinder group is backpressured by throttling or adjusting the EGR and exhaust valves inversely corresponding positions that provide the commanded EGR gas flow to the intake manifold beyond the maximum exhaust gas capability of the other donor cylinder group.

At 316, the method 300 includes fully opening the EGR valve and closing the exhaust valve of the other donor cylinder group to direct all exhaust gas from the other donor cylinder group to the intake manifold. Since the commanded EGR gas flow is beyond the exhaust gas capability of one donor cylinder group (e.g., the commanded EGR gas flow is greater than the EGR threshold), all the exhaust gas produced by the other donor cylinder group is needed for EGR and is directed to the intake manifold.

At 318, the method 300 includes closing the EGR valves of the donor cylinder groups. Correspondingly, the exhaust valves of the donor cylinder groups are fully opened. Since no EGR gas flow is commanded the EGR valves are closed and the exhaust valves are fully opened so as not to generate any extra backpressure in the cylinders of the donor cylinder groups. Accordingly, the cylinders may operate with a higher efficiency.

At 320, the method 300 includes closing the exhaust valves of the donor cylinder groups. Correspondingly, the EGR valves of the donor cylinder groups are fully opened to provide a maximum capable EGR gas flow that the first donor cylinder group and the second donor cylinder group can supply together.

By using donor cylinder groups to provides EGR gas flow and selectively backpressuring only as many donor cylinder groups as needed, the number of cylinders that are backpressured while providing EGR gas flow over a wide operating range can be reduced. Accordingly, a greater number of cylinders may operate with a higher efficiency.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. An engine system comprising:
    a first cylinder group including at least one first cylinder;
    a second cylinder group including at least one second cylinder;
    an intake manifold coupled to the first cylinder group and the second cylinder group;
    a first EGR passage coupled between the at least one first cylinder of the first cylinder group and the intake manifold;
    a second EGR passage coupled between the at least one second cylinder of the second cylinder group and the intake manifold;
    a first EGR valve, positioned in the first EGR passage, operable to control exhaust gas flow to the intake manifold;
    a second EGR valve, positioned in the second EGR passage, operable to control exhaust gas flow to the intake manifold; and
    a controller operable to backpressure only as many cylinder groups of the first cylinder group and the second cylinder group as needed to provide a commanded EGR gas flow, including the controller being operable to:
        during a first condition, adjust only one of the first EGR valve and the second EGR valve and close the other of the first EGR valve and the second EGR valve; and
        during a second condition, fully open one of the first EGR valve and the second EGR valve and adjust the other of the first EGR valve and the second EGR valve, wherein the controller is operable to adjust only one of the first EGR valve and the second EGR valve and close the other of the first EGR valve and the second EGR valve, to provide a first EGR gas flow to the intake manifold that is less than a maximum capable EGR gas flow that one of the first cylinder group or the second cylinder group can supply, and fully open one of the first EGR valve and the second EGR valve and adjust the other of the first EGR valve and the second EGR valve, to provide a second EGR gas flow that is greater than the maximum capable EGR gas flow that one of the first cylinder group of the second cylinder group can supply.

2. The engine system of claim 1, wherein the controller is operable to provide the first EGR gas flow when a commanded EGR flow is less than an EGR threshold, wherein the EGR threshold is the maximum capable EGR gas flow that one of the first cylinder group or the second cylinder group can supply, and wherein the controller is operable to provide the second EGR gas flow when the commanded EGR flow is greater than the EGR threshold.

3. The engine system of claim 1, wherein the controller is operable to close the first EGR valve and the second EGR valve for the first EGR gas flow to be zero and wherein the controller is operable to fully open the first EGR valve and the second EGR valve for the second EGR gas flow to be a maximum capable EGR gas flow that the first cylinder group and the second cylinder group can supply together.

4. The engine system of claim 1, further comprising:
    a first exhaust manifold coupled to the first cylinder group and not the second cylinder group, the first EGR passage coupling the first exhaust manifold to the intake manifold;
    a second exhaust manifold coupled to the second cylinder group and not the first cylinder group, the second EGR passage coupling the second exhaust manifold to the intake manifold;
    a first exhaust passage coupled between the first exhaust manifold and an exhaust pipe;
    a second exhaust passage coupled between the second exhaust manifold and the exhaust pipe;
    a first exhaust valve, positioned in the first exhaust passage, operable to control exhaust gas flow from the first exhaust manifold to the exhaust pipe;
    a second exhaust valve, positioned in the second exhaust passage, operable to control exhaust gas flow from the second exhaust manifold to the exhaust pipe; and the controller being operable to adjust one of the first exhaust valve or the second exhaust valve and close the other of the first exhaust valve and the second exhaust valve, to provide the first EGR gas flow, and adjust one of the first exhaust valve or the second exhaust valve and fully open the other of the first exhaust valve and the second exhaust valve, to provide the second EGR gas flow.

5. The engine system of claim 4, wherein the controller is operable to close the first exhaust valve and the second exhaust valve for the second EGR gas flow to be a maximum capable EGR gas flow that the first cylinder group and the second cylinder group can supply together.

6. The engine system of claim 4, wherein the first EGR valve and the first exhaust valve adjust in opposite directions and the second EGR valve and the second exhaust valve adjust in opposite directions.

7. The engine system of claim 4, further comprising:
a third cylinder group including at least one third cylinder;
a third exhaust manifold coupled to the third cylinder group and not the first cylinder group or the second cylinder group; and
a third exhaust passage coupled between the third cylinder group and the exhaust pipe.

8. The engine system of claim 7, wherein the engine system is a V-type engine including a first bank and a second bank, and the first cylinder group and the second cylinder group are positioned in the first bank and the third cylinder group is positioned in the second bank.

9. The engine system of claim 7, wherein the engine system is an inline engine, and the first cylinder group and the second cylinder group include interior cylinders and the third cylinder group includes at least one end cylinder.

10. An engine system comprising:
a first cylinder group including at least one first cylinder;
a second cylinder group including at least one second cylinder;
an intake manifold coupled to the first cylinder group and the second cylinder group;
a first EGR passage coupled between the at least one first cylinder of the first cylinder group and the intake manifold;
an EGR cooler coupled in the engine system;
a second EGR passage coupled between the at least one second cylinder of the second cylinder group and the intake manifold;
a first EGR valve, positioned in the first EGR passage, operable to control exhaust gas flow to the intake manifold;
a second EGR valve, positioned in the second EGR passage, operable to control exhaust gas flow to the intake manifold;
a controller operable to backpressure only as many cylinder groups of the first cylinder group and the second cylinder group as needed to provide a commanded EGR gas flow, including the controller being operable to:
during a first condition, adjust only one of the first EGR valve and the second EGR valve and close the other of the first EGR valve and the second EGR valve; and
during a second condition, fully open one of the first EGR valve and the second EGR valve and adjust the other of the first EGR valve and the second EGR valve, wherein the controller is operable to adjust only one of the first EGR valve and the second EGR valve and close the other of the first EGR valve and the second EGR valve, to provide a first EGR gas flow to the intake manifold that is less than a maximum capable EGR gas flow that one of the first cylinder group or the second cylinder group can supply, and fully open one of the first EGR valve and the second EGR valve and adjust the other of the first EGR valve and the second EGR valve, to provide a second EGR gas flow that is greater than the maximum capable EGR gas flow that one of the first cylinder group of the second cylinder group can supply;
a first exhaust manifold coupled to the first cylinder group and not the second cylinder group, the first EGR passage coupling the first exhaust manifold to the intake manifold;
a second exhaust manifold coupled to the second cylinder group and not the first cylinder group, the second EGR passage coupling the second exhaust manifold to the intake manifold;
a first exhaust passage coupled between the first exhaust manifold and an exhaust pipe;
a second exhaust passage coupled between the second exhaust manifold and the exhaust pipe;
a first exhaust valve, positioned in the first exhaust passage, operable to control exhaust gas flow from the first exhaust manifold to the exhaust pipe; and
a second exhaust valve, positioned in the second exhaust passage, operable to control exhaust gas flow from the second exhaust manifold to the exhaust pipe;
the controller being operable to adjust one of the first exhaust valve or the second exhaust valve and close the other of the first exhaust valve and the second exhaust valve, to provide the first EGR gas flow, and adjust one of the first exhaust valve or the second exhaust valve and fully open the other of the first exhaust valve and the second exhaust valve, to provide the second EGR gas flow.

11. The engine system of claim 10, wherein the controller is operable to provide the first EGR gas flow when a commanded EGR flow is less than an EGR threshold, wherein the EGR threshold is the maximum capable EGR gas flow that one of the first cylinder group or the second cylinder group can supply, and wherein the controller is operable to provide the second EGR gas flow when the commanded EGR flow is greater than the EGR threshold.

12. The engine system of claim 10, wherein the controller is operable to close the first EGR valve and the second EGR valve for the first EGR gas flow to be zero and wherein the controller is operable to fully open the first EGR valve and the second EGR valve for the second EGR gas flow to be a maximum capable EGR gas flow that the first cylinder group and the second cylinder group can supply together.

13. The engine system of claim 10, wherein the controller is operable to close the first exhaust valve and the second exhaust valve for the second EGR gas flow to be a maximum capable EGR gas flow that the first cylinder group and the second cylinder group can supply together.

14. The engine system of claim 10, wherein the first EGR valve and the first exhaust valve adjust in opposite directions and the second EGR valve and the second exhaust valve adjust in opposite directions.

15. The engine system of claim 10, further comprising:
a third cylinder group including at least one third cylinder;
a third exhaust manifold coupled to the third cylinder group and not the first cylinder group or the second cylinder group; and
a third exhaust passage coupled between the third cylinder group and the exhaust pipe.

16. The engine system of claim 10, wherein the engine system is a V-type engine including a first bank and a second bank, and the first cylinder group and the second cylinder group are positioned in the first bank and the third cylinder group is positioned in the second bank.

17. The engine system of claim 10, wherein the engine system is an inline engine, and the first cylinder group and the second cylinder group include interior cylinders and the third cylinder group includes at least one end cylinder.

\* \* \* \* \*